Jan. 14, 1936.  C. G. SUITS  2,027,846

REVERSIBLE SHADED POLE MOTOR

Filed Feb. 15, 1934

Inventor:
Chauncey G. Suits,
by Harry E. Dunham
His Attorney.

Patented Jan. 14, 1936

2,027,846

UNITED STATES PATENT OFFICE 2,027,846

REVERSIBLE SHADED POLE MOTOR

Chauncey G. Suits, Schenectady, N. Y., assignor to General Electric Company, a corporation of New York Application February 15, 1934, Serial No. 711,387

8 Claims. (Cl. 172—278)

My invention relates to dynamo electric devices and concerns particularly reversible motors of the shaded pole type.

It is an object of my invention to produce an alternating current motor, the starting or direction of rotation of which may be controlled by a control circuit or by the relative strengths of the currents acting in opposition in a pair of control circuits without modifying the motor power supply circuit.

A further object is to provide an arrangement permitting the use of direct current in the control circuit or circuits.

Other objects and advantages will become apparent as the description proceeds.

In accordance with my invention in its preferred form, I construct a dynamo electric device with a stator having its poles or pole pieces split into three portions and with shading coils around the center portions of the pole pieces. The alternating flux in the pole portion on one side or the other of the shaded pole portion is weakened by saturating said side pole portion by means of an auxiliary magneto-motive force so that the rotor is revolved by the action of the shifting field produced in the unsaturated pole portion and shaded pole portion.

The features of my invention which I believe to be novel and patentable will be pointed out in the claims appended hereto. A better understanding of my invention may be obtained from the following description taken in connection with the accompanying drawing in which Fig. 1 illustrates one embodiment of my invention and Fig. 2 represents a modified form of my invention employing an induction disc rotor.

Figure 1:
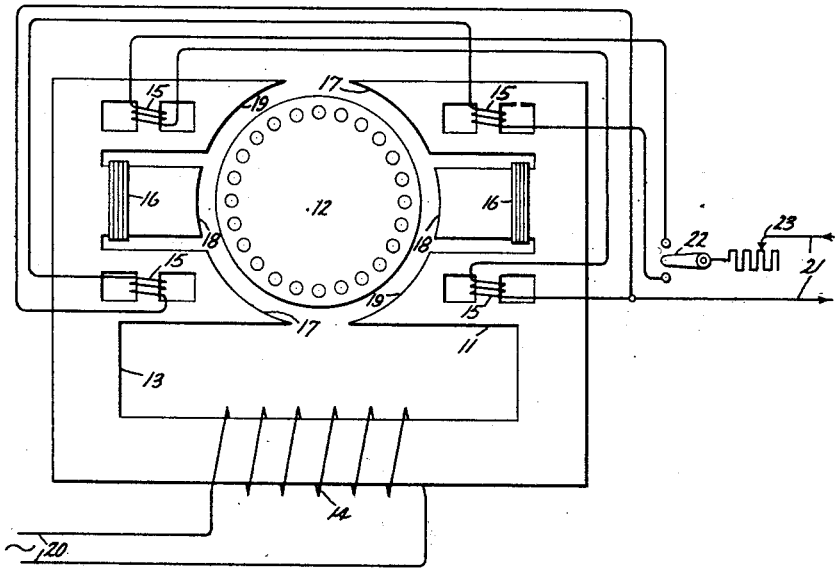
Figure 2:
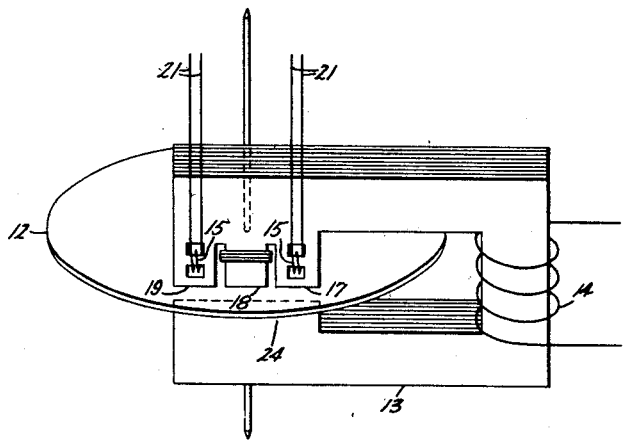

Referring to the drawing, the form of apparatus illustrated in Fig. 1 comprises a stator 11 and a rotor 12 cooperating therewith. The rotor may be of any desired type such as, for example, the squirrel cage type. The stator comprises a core 13 of suitable material such as electrical steel laminations, for example, a main or exciting winding 14, saturating windings 15, and shading coils 16. The core 13 includes a plurality of poles or pole pieces, in the present case two, each of which is divided into three portions. The parts are so arranged as to leave an air gap of suitable dimensions between the rotor 12 and the pole faces of the pole portions 17, 18 and 19.

The exciting winding 14 is supplied with alternating current from a source 20 and causes an alternating current flux to pass between the poles and through the rotor 12. The shading coils 16 are composed of short-circuited rings or coils which serve to increase the inductance of the pole portions 18, thereby causing the flux in the center pole portions 18 to lag behind the main flux produced by the winding 14. Consequently, the flux tends to shift between the center pole portions 18 and the outer pole portions 17 and 19. In order to produce a torque in a given direction, tending to start the motor and retain it in rotation in a given direction, means are provided for weakening or overcoming the effect of the flux in one pair of outer pole portions 17 or 19. For example, if it is desired to operate the rotor in the clockwise direction, the flux in the pole portions 19 is weakened so that the flux tends to shift between pole portions 17 and 18, producing currents in the rotor 12 which react upon the stator flux to produce motor torque and rotor rotation.

The flux in either pair of outer pole portions may be effectively weakened by saturating the pole portion with an auxiliary source of magneto-motive force. For example, if a current is caused to flow through the coils 15 of the pole portions 19, a transverse magnetic flux will be set up in these pole portions, which neither opposes nor aids the main magnetic flux but tends to saturate the pole portions by raising the flux density. Consequently, the amplitude of the alternations in magnetic flux produced by the winding 14 in the pole portions 19 is reduced and the motor operates as if the flux shifted merely between the pole portions 17 and 18 as in the usual type of shaded pole, single phase induction motor.

Although I prefer to mount the saturating coils 15 on transverse legs, bridging recesses in the pole portions 17 and 19, thereby obtaining a transverse saturating flux in order to minimize the effect of the saturating flux on the main flux and on the main flux path of the core 13, it will be understood that my invention is not limited to the exact construction shown.

Although either alternating current or direct current may be employed for saturating the side pole portions, I prefer to utilize direct current since in this manner I may produce an alternating current motor which may be controlled by direct current. A source of direct current 21 may be controlled by means of a switch 22 to cause current to flow in the auxiliary windings of either pair of side pole portions. If the switch 22 is moved to the downward position, the motor will operate clockwise in the manner described and, if it is moved to the upward position, the motor will operate in a counterclockwise direction since the pole portions 17 instead of 19 will then be saturated. By controlling the degree of saturation as by an adjustable impedance 23, the torque, slip and speed of the motor may be accurately controlled.

If desired, the pairs of auxiliary windings 15 may also be connected in two different direct current circuits and the direction of rotation and torque of the motor will then depend upon the relative strengths of the currents flowing in the two circuits. As thus arranged, the motor is valuable as a servo-motor or in arrangements where an alternating current motor is desired for automatically adjusting apparatus having direct current circuits. It will also be apparent that the invention may be applied to induction disc motors.

In the arrangement shown in Fig. 2, for example, the rotor 12 is of the induction disc type. Obviously, only one of the pole pieces need be split and the pole piece 24 may, if desired, have merely a flat face without windings, serving merely as a part of the path for the shifting magnetic flux from the pole pieces 17 and 18, or 18 and 19. Figure 2 also illustrates an arrangement in which the motor direction, speed, and torque respond to the absolute and relative strengths of currents in two independent control circuits 21. A change in strength of either or both currents will, obviously, modify the torque and slip of the motor, and a reversal in relative strength will, obviously, result in reversal of the direction of motor torque and rotation.

In accordance with the provisions of the patent statutes, I have described the principle of operation of my invention, together with apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A dynamo electric device having a rotor and a stator comprising split poles, having a center shaded portion and unshaded side portions, means for causing an alternating main magnetic flux to pass between the poles through said rotor, and means for saturating the pole portions at one side of said shaded pole center portions, thereby weakening the component of main flux in said saturated portions, producing a shifting magnetic field between said unshaded, unsaturated pole portions and said shaded pole portions, and exerting a torque on said rotor.

2. In a dynamo electric device, a field element therefor comprising split poles, each having a center shaded portion and unshaded side portions, means for causing an alternating main magnetic flux to pass between the poles, and means for saturating the pole portions at one side of said shaded pole center portions, thereby weakening the component of main flux in said saturated portions, producing a shifting magnetic field between said unshaded, unsaturated pole portions and said shaded pole portions.

3. A dynamo electric device having a rotor and a stator comprising split poles, each having a center shaded portion and unshaded side portions, means for causing an alternating main magnetic flux to pass between the poles through said rotor, said side portions carrying current conducting windings with magnetic axes transverse to the direction of the main flux in said poles, and means for energizing the windings carried by the pole portions at one side of said shaded pole center portions, thereby saturating said latter side pole portions and weakening the component of main flux therein, producing a shifting magnetic field between said unshaded, unsaturated pole portions and said shaded pole portions, and exerting a torque on said rotor.

4. A dynamo electric device having a rotor and a stator comprising split poles, each having a center shaded portion and unshaded side portions, means for causing alternating main magnetic flux to pass between the poles through said rotor, said side portions each having a pair of transverse recesses between which a transverse leg is formed and a current conducting winding on said leg, and means for energizing said current conducting winding at one side of said shaded center pole portions, thereby saturating said latter side pole portions and weakening the component of main flux therein, producing a shifting magnetic field between said unshaded, unsaturated pole portions and said shaded pole portions, and exerting a torque on said rotor.

5. A reversible motor having a rotor and a stator comprising split poles, each having a center shaded portion and unshaded side portions carrying independent windings, means for causing an alternating main magnetic flux to pass between the poles through said rotor, and means for energizing the independent windings carried by the pole portions at one side of said shaded center pole portions with direct current, thereby weakening the component of main flux in said latter side pole portions, producing a shifting magnetic field between said side pole portions not having weakened flux and said shaded pole portions, and exerting a torque on said rotor in the direction toward the pole portions having weakened flux.

6. An alternating current motor having a field structure with a pole split into three portions, a shading coil on the center portion, an alternating current energizing winding on said field structure and means for making the magnetic fluxes produced by said energizing winding unequal on either side of said shaded pole portion and for changing the path of the excess flux from one side of said shaded pole portion to the other to control said motor.

7. A dynamo electric device having a field structure with a pole split into three portions, means for producing an alternating magnetic field in said field structure, a shading coil on the center portion of said pole, and means for saturating a pole portion at one side of said center pole portion to control said device.

8. In an alterating current motor having a pole piece split into three portions with the center portion shaded, the method of controlling the direction of rotation of said motor which consists in saturating the portion of the pole piece at the side of the shaded portion toward which rotation is desired to diminish the effect of the flux in the saturated portion of said pole piece relative to the effect of the flux in the portion of the pole piece on the other side of said shaded portion.

CHAUNCEY G. SUITS.